United States Patent [19]

Lefebvre

[11] Patent Number: 5,562,003
[45] Date of Patent: Oct. 8, 1996

[54] APPARATUS FOR DETECTING THE LEVEL OF A LIQUID IN A TANK

[75] Inventor: Patrick Lefebvre, Pontault-Combault, France

[73] Assignee: Sauermann Industrie, Pontault-Combault Cedex, France

[21] Appl. No.: 392,043

[22] Filed: Feb. 22, 1995

[30] Foreign Application Priority Data

Feb. 28, 1994 [FR] France .................................. 94 02235

[51] Int. Cl.⁶ .................................................. G01F 23/46
[52] U.S. Cl. ................................................ 73/308; 73/314
[58] Field of Search ............................. 73/290, 304, 305, 73/314, 313, 322.5, 308

[56] References Cited

U.S. PATENT DOCUMENTS

| | | | |
|---|---|---|---|
| 4,371,000 | 2/1983 | Shinoda ................................. | 73/322.5 |
| 4,395,605 | 6/1983 | Weston .................................. | 73/308 |
| 4,497,205 | 2/1985 | Zulauf et al. ........................ | 73/308 |
| 4,617,806 | 10/1986 | Sakai et al. ........................ | 73/308 |
| 4,748,300 | 5/1988 | Anderson ............................ | 73/308 |
| 4,771,804 | 9/1988 | Morales .............................. | 73/313 |
| 5,156,048 | 10/1992 | DeFigueiredo et al. .............. | 73/308 |

FOREIGN PATENT DOCUMENTS

| | | |
|---|---|---|
| 0397338 | 11/1990 | European Pat. Off. . |
| 2683316 | 5/1993 | France . |
| 3828520A1 | 3/1990 | Germany . |

*Primary Examiner*—Richard Chilcot
*Assistant Examiner*—Max Noori
*Attorney, Agent, or Firm*—Graham & James

[57] ABSTRACT

An apparatus is provided for detecting the level of a liquid in a tank. The apparatus is designed to be connected to a controller that controls a pump so as to switch the pump on when the liquid level reaches a maximum authorized level and to stop operation of the pump when the level of the liquid has gone back down to a minimum level. The apparatus includes a float that is lifted by the liquid and that is guided vertically. The apparatus also includes a magnet that is carried by the float, and at least two switches each having contacts sealed in a capsule. Each switch is fixed in a horizontal fashion to a plate so as to correspond to a predetermined liquid level, and each switch turns on an electrical circuit connected to the controller when the switch is in the magnetic field of the magnet. The plate is disposed in a vertical plane that is parallel to and in close proximity to the displacement of the float.

12 Claims, 3 Drawing Sheets

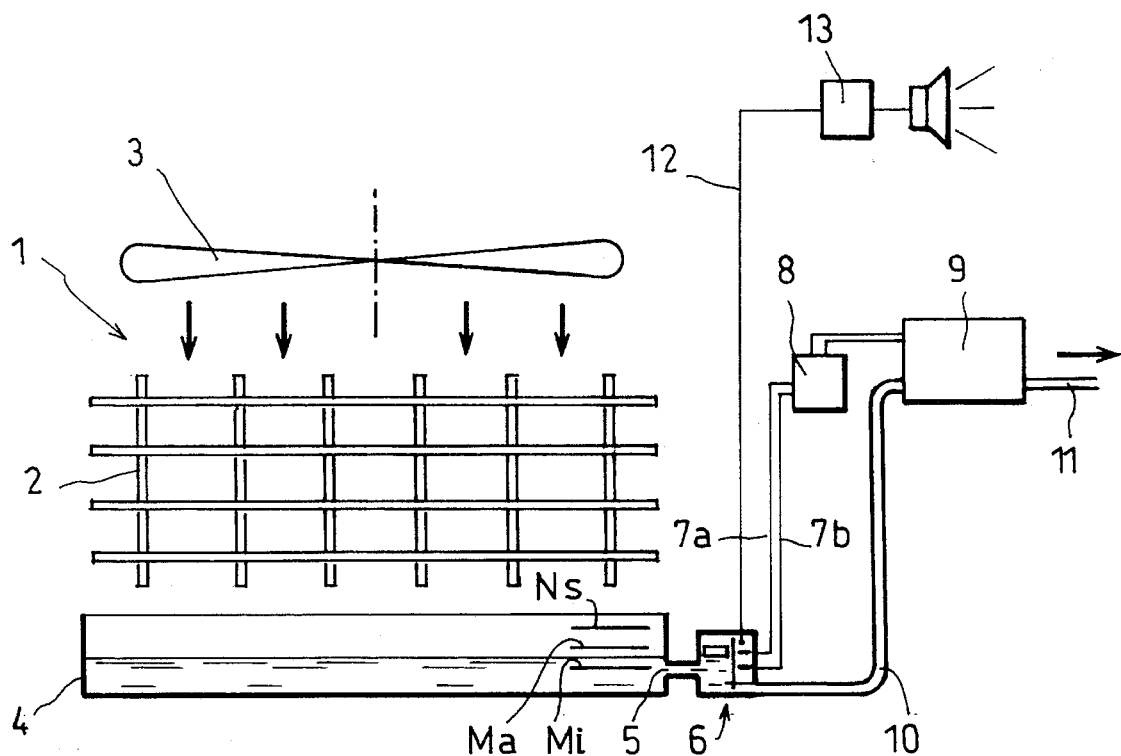
FIG_1
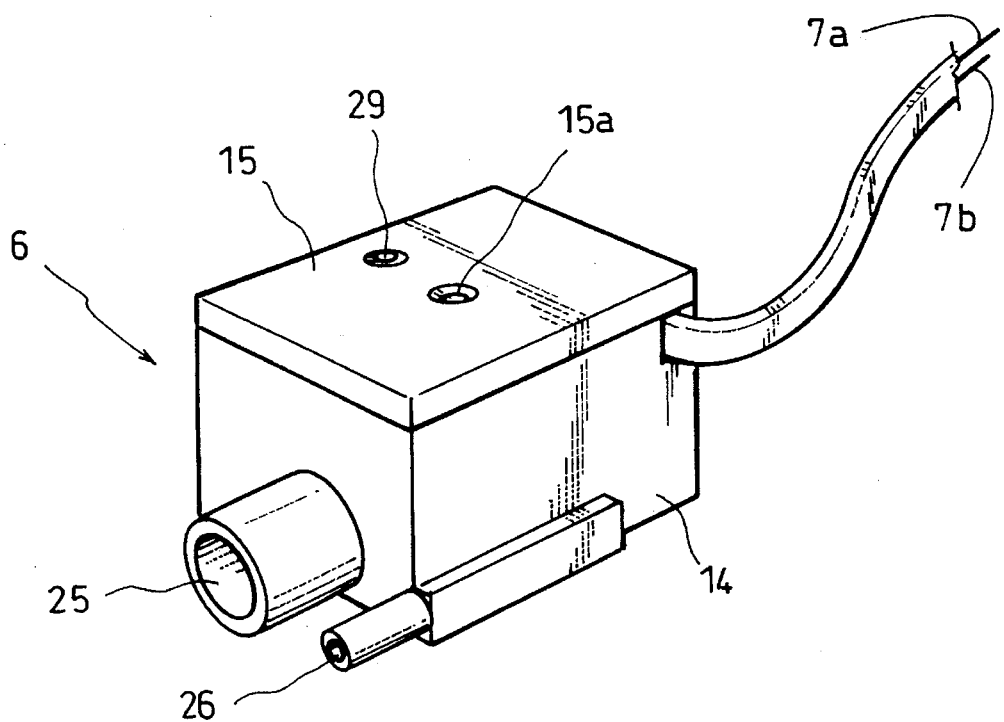
FIG_2

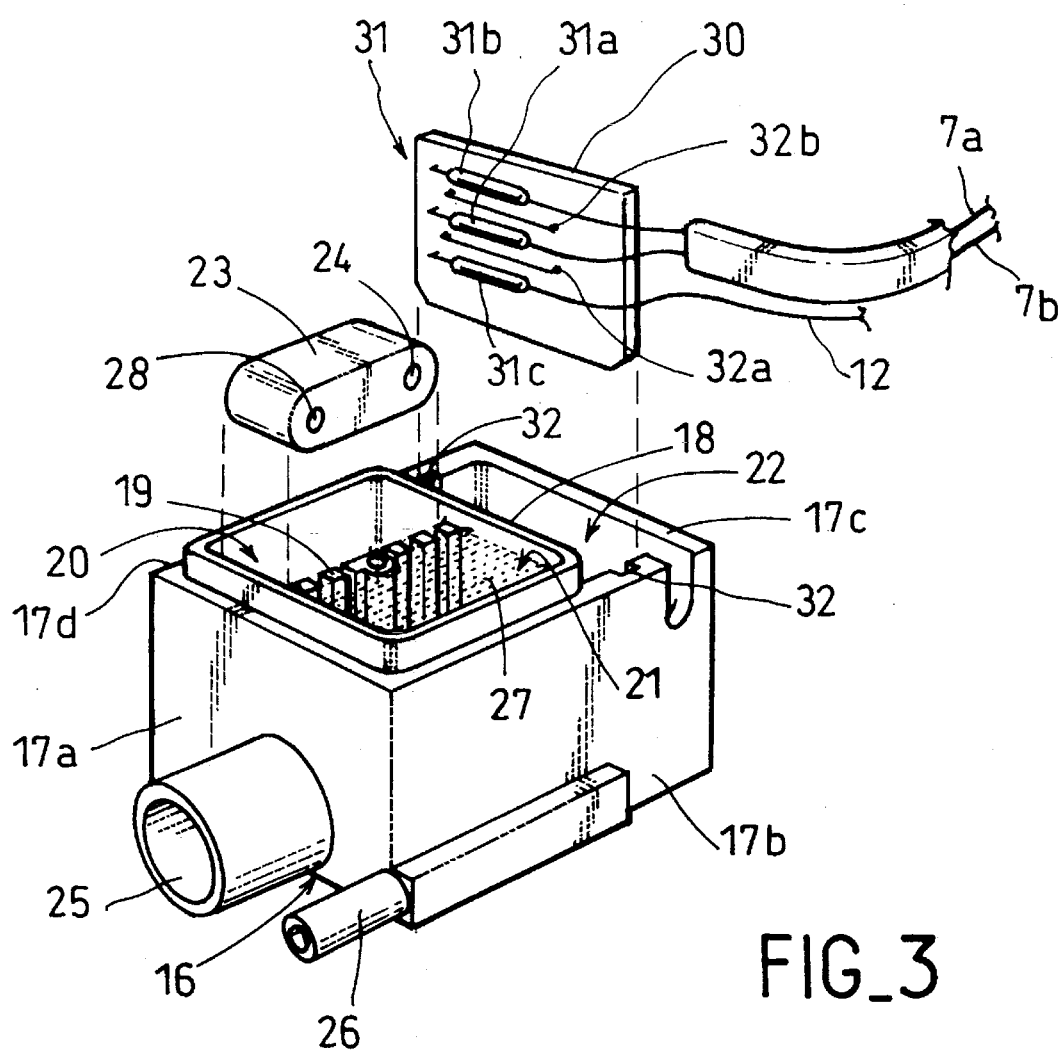
FIG_3
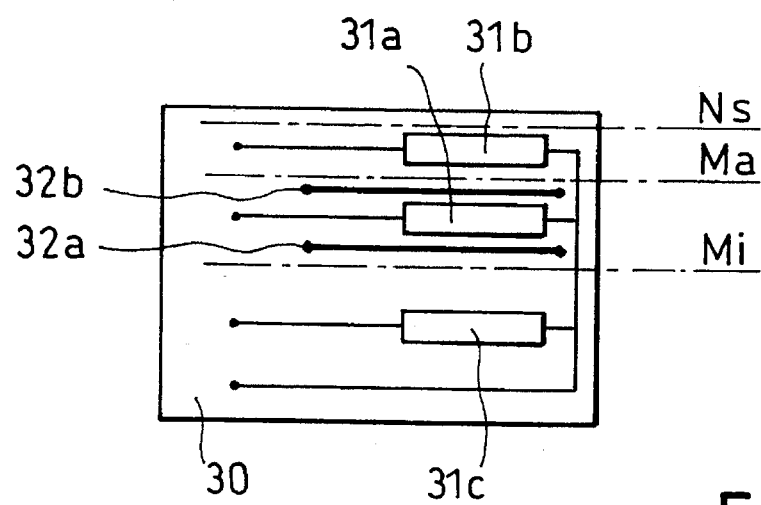
FIG_4

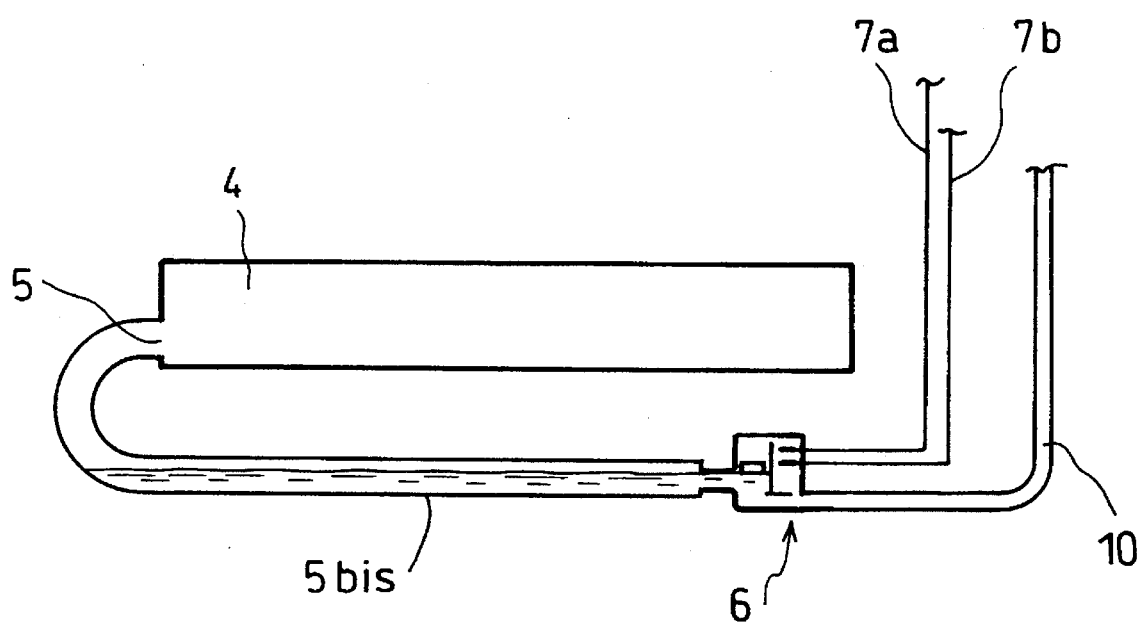
FIG_5

APPARATUS FOR DETECTING THE LEVEL OF A LIQUID IN A TANK

The present invention relates to apparatus for detecting the level a liquid in a tank for recovering a condensate, and it is designed to be connected to control a pump for raising the condensate.

BACKGROUND OF THE INVENTION

In air conditioning appliances, water condenses on the walls of heat exchangers. This condensation water falls under gravity into tanks for recovering the condensate. Thereafter it must be removed in order to avoid overflows. Depending on the position of the tanks relative to the drain pipes, it may be necessary to provide pumps for raising the condensate. Such condensate-raising pumps are provided with control systems that put the pump automatically into operation whenever the level of liquid reaches a maximum predetermined level and that automatically stops operation of the pump when the level of the condensate liquid in the tank has gone back down to a minimum level.

Such control systems are connected to apparatuses for detecting the level of liquid in the tank and that issue a first signal when the level of the condensate reaches a maximum permitted level and a second signal when the level of the condensate reaches a minimum authorized level.

Level detector apparatuses are already known that include electrodes situated at different levels in the tank. Water allows a micro-current to pass from one electrode to another. The micro-current causes the pump to start or stop depending on the level of the condensate. That solution is compact, but unfortunately the quality of the water has an influence on the magnitudes of the micro-currents, and the presence of algae or of fat on the surface of the condensate can give rise to mis-operation.

To remedy those drawbacks, proposals have been made for liquid level detection apparatuses that include a float which is raised by the liquid, a magnet carried by the float, and at least two switches each having contacts sealed in an elongate glass capsule disposed in the vicinity of the path of said magnet and at respective different vertical heights, each of the switches causing an electrical circuit associated with said control to close when the switch is subjected to the magnetic field of the magnet. In known apparatuses, the capsules are disposed vertically or they are placed above the float.

The height of the detection apparatus is not less than the length of a capsule plus the difference between the minimum and maximum levels authorized for condensate in the tank. This height may be greater than 60 mm, particularly when a third capsule is provided connected to a device for detecting a safety level above the maximum level for putting the pump into operation. In certain types of air conditioner (ceiling mounted, wall mounted mini-split types) that require a shallow tank or the installation of a level sensor at the end of the condensate drain, this minimum possible height or possible size for the sensor housing can be unacceptable.

FR-A-2 683 316 shows one such device in which the capsules are disposed vertically in a guide tube for an annular float that caries an annular magnet.

EP-A-397 338 relates to apparatus for accurately measuring the level of liquid in a motor vehicle tank. That apparatus likewise includes an annular magnet carried by a cylindrical float which runs along a vertical wall placed close to superposed horizontal capsules. The object of that disposition is not to reduce the height of the apparatus but to increase the accuracy of measurement.

OBJECT AND SUMMARY OF THE INVENTION

The object to the present invention is to provide apparatus for detecting the level of liquid in a condensate recovery tank or at the end of a drain therefor which is effective and of small height.

The invention thus provides an apparatus for detecting the level of a liquid in a condensate recovery tank, the apparatus being designed for connection to control means for controlling a condensation-raising pump, so as to switch the pump on when the liquid level reaches a maximum authorized level and to stop operation of the pump when the level of the liquid has gone back down to a minimum level, said apparatus including a float that is lifted by said liquid and that is guided vertically, a magnet carried by said float, and at least two switches each having contacts sealed in a capsule, the switches being disposed in the vicinity of the path of said magnet and being vertically offset, each of said switches serving to switch on an electrical circuit connected to said control means when said switch is in the magnetic field of said magnet.

In the detection apparatus of the invention said capsules are disposed horizontally in a vertical plane parallel to the displacement of the float, the float is generally rectangular in shape, the magnet is disposed close to a side wall of said float, and a metal bar is provided on the side of the float opposite from said magnet.

This disposition makes its possible to reduce the height of the level detection apparatus considerably while providing successive items of information (switch on, switch off, alarm).

In order to enable each circuit to close cleanly, even when the difference between the minimum and maximum condensate levels is small, a magnetic field deflector is advantageously provided below the capsules. The magnetic field deflector may be constituted by a ferro-nickel wire.

BRIEF DESCRIPTION OF THE DRAWINGS

Other advantages and characteristics of the invention appear on reading the following description given by way of example and made with reference to the accompanying drawings, in which:

FIG. 1 is a diagrammatic elevation view of an air conditional installation fitted with level detector apparatus of the invention;

FIG. 2 is a perspective view of the level detector apparatus of the invention;

FIG. 3 is an exploded view of the level detector apparatus of FIG. 2 with its cover removed for reasons of clarity;

FIG. 4 is an elevation view of the capsule-support plate; and

FIG. 5 shows a variant disposition for the apparatus of the invention relative to the tank.

MORE DETAILED DESCRIPTION

FIG. 1 shows an air conditioner installation 1 which includes a heat exchanger 2 through which there flows a coolant fluid that is designed to cool ambient air set into motion by a fan 3. A tank 4 is placed beneath the heat exchanger 2 to recover condensation water that flows under gravity down the outside walls of the heat exchanger 2. The tank 4 has a lateral orifice 5 or condensate drain pipe 5bis. The orifice 5 or the end of the pipe 5bis is connected to liquid level detection apparatus 6. The apparatus 6 is connected via two electrical circuits 7a and 7b to a device 8 for controlling a raising pump 9. The condensate-raising pump 9 is connected to the tank 4 via a flexible suction hose 10 and it delivers pumped liquid to a main drain pipe (not shown in the drawing) via an outlet duct 11. Communication between the suction hose 10 and the tank 4 takes place via the liquid level detection apparatus 6, as described below.

When the level of liquid in the tank 4 or in the pipe 5bis reaches the maximum level Ma, the electrical circuit 7a is switched on and the control device 8 puts the pump 9 into operation. The condensate is sucked in via the hose 10 and is exhausted into the main drain pipe.

When the level of condensate has gone back down to the minimum level Mi, circuit 7b is closed and the control device stops operation of the pump 9.

The level detection apparatus 6 may also be connected via an electrical circuit 12 to trigger apparatus 13 whenever the liquid in the tank 4 reaches a safety level Ns that is higher than the level Ma.

FIGS. 2 and 3 show the level detection apparatus 6 of the invention in detail.

The detection apparatus 6 comprises a generally rectangular housing 14 that is closed by a top cover 15. The housing 14 has a bottom 16, four side walls 17a, 17b, 17c, and 17d, a transverse wall 18 a vertical grid 19 perpendicular to the transverse wall 18. The inside of the housing 14 is thus subdivided into three chambers 20, 21, and 22, all three of which are closed by the cover 15. In the first chamber 20, there is provided a rectangular float 23 carrying a magnet 24 close to the transverse wall 18. The second chamber 21 communicates with the first chamber 20 via the grid 19. It also communicates with the tank 4 or with the pipe 5bis and with the pump 9. To this end, on the side wall 17a, there are formed a first endpiece 25 for connecting the housing 14 to the orifice 5 of the tank 4 or to the pipe 5b is, and a second endpiece 26 designed for coupling to the pump hose 10. A filter element 27 fills the second chamber 21.

A small orifice through the wall that closes, in part, the bottom of the endpiece 25 and the chamber 20 serves to admit water directly from the tank 4 or from the pipe 5bis into the chamber 20 in the event of the filter element 27 becoming clogged. In order to keep the float 23 substantially horizontal on the surface of the condensate liquid in the first chamber 20, a metal bar 28, e.g. made of copper, is provided close to the opposite edge of the float remote from its edge housing the magnet 24. The metal bar is similar in weight to the magnet 24.

The housing 14 and the cover 15 are made of a plastics material, with the cover 15 being fixed to the housing by a screw 15a. A vent hole 29 is provided in the cover 15 above the first chamber 20. This vent hole 29 can be closed by the top face of the float 23.

In the third chamber 22, there is provided a capsule-mounting plate 30 where each capsule 31 contains a sealed contact switch that is sensitive to a magnetic field. These capsules are of the "Reed Switch" type. The plate 30 is mounted vertically and is held in grooves 32 provided in the walls 17b and 17d.

The capsules 31 which may be two or three in number are mounted horizontally on the plate 30 in a vertical plane that is close to the first chamber 20. When subjected to the magnetic field of the magnet 24, the middle capsule 31a serves to switch on electrical circuit 7b. When subjected to the magnetic field of the magnet 24, the top capsule 31b serves to switch on electrical circuit 7a. The bottom capsule 31c which is optional serves to activate electrical circuit 12 connected to the alarm triggering device 13. This capsule 31c is activated when the float 23 is in its low position, but when the float reaches level Ns, the capsule is no longer activated while the circuit 12 is activated. The three capsules 31a, 31b, and 31c are disposed at locations that correspond respectively to liquid levels Mi, Ma, and Ns.

Ferro-nickel wires 32a and 32b may be placed between the capsules 31a, 31b, and 31c, particularly when the capsules are very close together. These wires serve to modify the magnetic field of the magnet 24.

FIG. 4 shows how the positions of the capsules 31a, 31b, and 31c correspond to the levels Mi, Ma, and Ns that are to be detected.

The way in which the apparatus operates is easily understood and does not require additional explanation.

Because the capsules 31a, 31b, and 31c are disposed horizontally in a vertical plane, successive items of information (on, off, alarm) are obtained logically while limiting the height of the level detecting apparatus 6 to 30 mm.

The magnet 24 is advantageously in the form of a metal bar.

I claim:

1. An apparatus for detecting predetermined levels of a liquid in a tank comprising:

a float having magnetic material fixedly attached thereto;

vertical guide means for defining a vertical displacement path of said float, said float being displaced along said vertical displacement path by said liquid;

a plate disposed parallel to said vertical displacement path;

a first contact switch fixedly attached to said plate in a horizontal fashion, contacts of said first contact switch being activated by a magnetic field from said magnet;

a second contact switch fixedly attached to said plate in a horizontal fashion and spaced vertically from said first contact switch, contacts of said second contact switch being activated by said magnetic field from said magnet;

a third contact switch fixedly attached to said plate in a horizontal fashion and spaced vertically from said first and second contact switches, contacts of said third contact switch being activated by said magnetic field from said magnet; and alarm connection means for connecting said third switch to an alarm.

2. The apparatus of claim 1, further comprising a magnetic field deflector disposed between said first and second contact switches.

3. The apparatus of claim 2, wherein said magnetic field deflector comprises a ferro-nickel wire.

4. The apparatus of claim 1, wherein said vertical guide means comprises a first chamber, said first chamber being in communication with a second chamber via a grid, said second chamber being in communication with said tank and said pump via lateral orifices.

5. The apparatus of claim 4, wherein a filter is provided in said second chamber.

6. An apparatus for detecting predetermined levels of a liquid in a tank comprising:

a generally rectangular float having magnetic material fixedly attached thereto;

vertical guide means for defining a vertical displacement path of said float, said float being displaced along said vertical displacement path by said liquid;

a plate disposed parallel to said vertical displacement path;

a first contact switch fixedly attached to said plate in a horizontal fashion, contacts of said first contact switch being activated by a magnetic field from said magnet;

a second contact switch fixedly attached to said plate in a horizontal fashion and spaced vertically from said first contact switch, contacts of said second contact switch being activated by said magnetic field from said magnet; and a metal bar fixedly attached to said float, wherein said magnetic material comprises a magnet that is disposed on a first side of said float and said metal bar is disposed on a side of said float that is opposite from said first side.

7. The apparatus of claim 1, wherein said first contact switch is sealed in a first capsule and said second contact switch is sealed in a second capsule.

8. The apparatus of claim 1 further comprising:

pump control connection means for connecting said first and second contact switches to a pump controller.

9. The apparatus of claim 8, wherein activation of said first contact switch causes said pump controller to switch a pump on and activation of said second contact switch causes said pump controller to switch said pump off.

10. The apparatus of claim 9, wherein said pump removes said liquid from said tank.

11. The apparatus of claim 1, wherein said first switch fixedly attached to said plate corresponds to a first predetermined level of said liquid in said tank and said second switch fixedly attached to said plate defines a second predetermined level of said liquid in said tank.

12. The apparatus of claim 1, wherein said first switch fixedly attached to said plate corresponds to a first predetermined level of said liquid in said tank, said second switch fixedly attached to said plate defines a second predetermined level of said liquid in said tank, and said third switch fixedly attached to said plate corresponds to a third predetermined level of said liquid in said tank.

\* \* \* \* \*